(12) United States Patent
Ohtsuka

(10) Patent No.: US 9,606,296 B2
(45) Date of Patent: Mar. 28, 2017

(54) OPTICAL PATH CONTROL DEVICE

(71) Applicant: Sumitomo Electric Industries, Ltd., Osaka-shi (JP)

(72) Inventor: Takafumi Ohtsuka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/994,670

(22) Filed: Jan. 13, 2016

(65) Prior Publication Data

US 2016/0124152 A1    May 5, 2016

Related U.S. Application Data

(63) Continuation of application No. PCT/JP2013/081542, filed on Nov. 22, 2013.

(30) Foreign Application Priority Data

Jul. 17, 2013    (WO) ................. PCT/JP2013/069405

(51) Int. Cl.
| | |
|---|---|
| *G02B 6/35* | (2006.01) |
| *G02B 6/293* | (2006.01) |
| *G02B 26/02* | (2006.01) |
| *G02B 6/32* | (2006.01) |

(52) U.S. Cl.
CPC ......... *G02B 6/3594* (2013.01); *G02B 6/2938* (2013.01); *G02B 6/29392* (2013.01); *G02B 6/352* (2013.01); *G02B 6/356* (2013.01); *G02B 6/3512* (2013.01); *G02B 6/3534* (2013.01); *G02B 6/3542* (2013.01); *G02B 26/02* (2013.01); *G02B 6/32* (2013.01)

(58) Field of Classification Search
CPC .............................. G02B 6/356; G02B 6/3594
See application file for complete search history.

(56) References Cited

U.S. PATENT DOCUMENTS

| | | |
|---|---|---|
| 6,781,730 B2 | 8/2004 | Weaver et al. |
| 7,397,980 B2 | 7/2008 | Frisken |
| 7,725,027 B2 | 5/2010 | Keyworth et al. |
| (Continued) | | |

FOREIGN PATENT DOCUMENTS

| | | |
|---|---|---|
| JP | 2008-139477 A | 6/2008 |
| JP | 2008-224824 A | 9/2008 |
| (Continued) | | |

OTHER PUBLICATIONS

Notice of Allowance in U.S. Appl. No. 14/905,039, mailed Jun. 21, 2016.

(Continued)

*Primary Examiner* — Omar R Rojas
(74) *Attorney, Agent, or Firm* — Venable LLP; Michael A. Sartori; Laura G. Remus

(57) ABSTRACT

In an optical path control device, a light input section 1 forms optical apertures 61a, 61b to output dispersed beams L2a, L2b, respectively, so that propagation angles of the dispersed beams L2a, L2b in an YZ plane are different from each other, at a focal position on the dispersive element 5 side of an optical power element 6. The dispersed beams L2a, L2b propagating at their respective angles different from each other in the YZ plane are individually coupled to optical deflectors 7a, 7b, respectively.

9 Claims, 9 Drawing Sheets

(56) References Cited

U.S. PATENT DOCUMENTS

| | | | | |
|---|---|---|---|---|
| 8,190,025 B2 * | 5/2012 | Presley | ............... | G02B 6/3544 356/325 |
| 2008/0298738 A1 | 12/2008 | Ishikawa et al. | | |
| 2009/0110349 A1 | 4/2009 | Presley et al. | | |
| 2011/0229132 A1 | 9/2011 | Matsumoto | | |
| 2011/0292482 A1 | 12/2011 | Matsumoto | | |
| 2012/0002917 A1 | 1/2012 | Colbourne | | |
| 2012/0057869 A1 | 3/2012 | Colbourne | | |
| 2012/0237218 A1 | 9/2012 | Yang et al. | | |
| 2012/0328238 A1 | 12/2012 | Inoue et al. | | |
| 2013/0028556 A1 | 1/2013 | Cohen et al. | | |
| 2014/0072302 A1 | 3/2014 | Iwama et al. | | |
| 2014/0268305 A1 | 9/2014 | Tazawa et al. | | |
| 2015/0023662 A1 | 1/2015 | Suzuki et al. | | |

FOREIGN PATENT DOCUMENTS

| | | |
|---|---|---|
| JP | 2009-276747 A | 11/2009 |
| JP | 2010-509639 A | 3/2010 |
| JP | 2011-064721 A | 3/2011 |
| JP | 2011-145462 A | 7/2011 |
| JP | 2011-197400 A | 10/2011 |
| JP | 2011-248000 A | 12/2011 |
| JP | 2014-067004 A | 4/2014 |
| WO | WO-2008/057347 A2 | 5/2008 |
| WO | WO-2012/125390 A2 | 9/2012 |
| WO | WO-2013/016758 A1 | 2/2013 |

OTHER PUBLICATIONS

International Search Report in International Patent Application No. PCT/JP2013/081542, dated Feb. 10, 2014.
International Search Report in International Patent Application No. PCT/JP2013/069405, dated Sep. 17, 2013.
International Preliminary Report on Patentability and Written Opinion in International Patent Application No. PCT/JP2013/069405, dated Jan. 28, 2016.
International Preliminary Report on Patentability and Written Opinion in International Patent Application No. PCT/JP2013/081542, dated Jan. 28, 2016.
Notice of Allowance in Japanese Patent Application No. 2015-527140, dated Jul. 19, 2016.
Notice of Reasons for Rejection in counterpart Japanese Patent Application No. 2015-527101, dated Dec. 6, 2016.

* cited by examiner

Fig.4
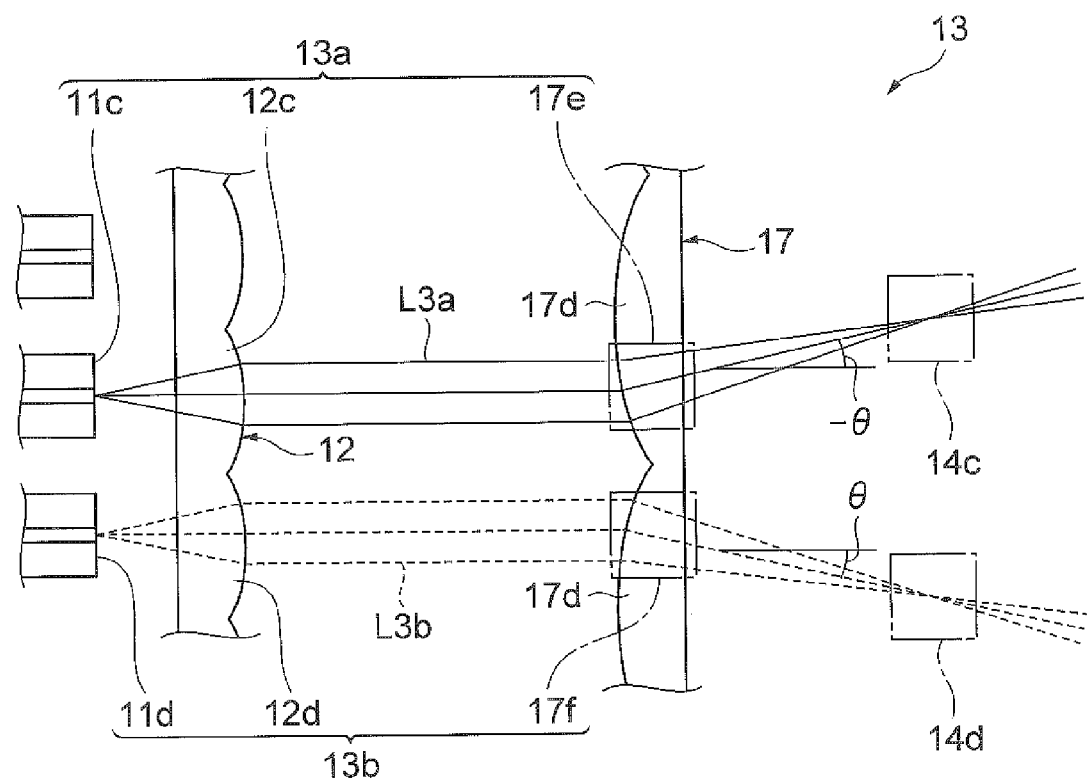
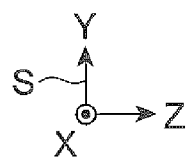

OPTICAL PATH CONTROL DEVICE

CROSS REFERENCE TO RELATED APPLICATIONS

This application is a Continuation of PCT International Application No. PCT/JP2013/081542, filed Nov. 22, 2013, which claims the benefit of PCT International Application No. PCT/JP2013/069405, filed Jul. 17, 2013.

TECHNICAL FIELD

The present invention relates to an optical path control device.

BACKGROUND

Patent Literature 1 (Japanese Patent Application Laid-open Publication No. 2009-276747) discloses a wavelength selective switch to be used in a wavelength division multiplex system. This wavelength selective switch has a plurality of fiber ports arranged in a fiber port array and a plurality of optical elements capable of operating in conjunction with the plurality of fiber ports. Furthermore, this wavelength selective switch has a dispersive element and a switching element. The dispersive element decomposes at least one optical signal into a plurality of wavelength components. The switching element is composed of MEMS (Micro Electro Mechanical System) mirrors and configured to guide one selected from the plurality of wavelength components to one selected from the plurality of fiber ports. Patent Literature 2 (Japanese Translation of PCT Application Publication No. 2010-509639) discloses an optical switch. This optical switch has two fiber port arrays each of which has a plurality of fiber ports. Each fiber port array is configured either with N input fiber ports and 1 output fiber port or with 1 input fiber port and N output fiber ports. Light beams input from the two respective fiber port arrays are guided to two respective MEMS mirrors by a beam guide element disposed immediately in front of a switching element.

SUMMARY

As one form of the wavelength selective switch there is a form in which a plurality of light input/output ports are divided into two or more groups and in which two or more optical deflectors corresponding to respective groups of input/output beams are arranged in juxtaposition, for example, in a direction intersecting with a direction of dispersion (e.g., cf. Patent Literature 2). By adopting this form, it becomes feasible to separate (or couple) a larger number of wavelength components than by the conventional wavelength selective switches.

However, the wavelength selective switch described in Patent Literature 2 uses the beam guide element, for input/output of each group of beams to or from each optical deflector. In this configuration, if a position of incidence of a beam belonging to a certain group to the beam guide element deviates from a prescribed position, the whole or part of the beam will impinge on the optical deflector corresponding to another group, causing crosstalk between the groups.

One aspect of the present invention relates to an optical path control device. This optical path control device is an optical path control device comprising first to thirteenth elements. The first element includes a first input port to which a first wavelength-multiplexed beam is input and a second input port to which a second wavelength-multiplexed beam is input. The second element is comprised of the third and fourth elements and is an anamorphic converter configured to convert an aspect ratio of beam spots of the first and second wavelength-multiplexed beams input from the first and second input ports. The third element includes first and second optical power elements arranged in juxtaposition in propagation directions of the first and second wavelength-multiplexed beams and configured to converge the first and second wavelength-multiplexed beams in a plane spanned by the propagation directions of the first and second wavelength-multiplexed beams and a first direction. The fourth element includes a third optical power element configured to collimate the first and second wavelength-multiplexed beams in a plane spanned by a second direction perpendicular to the first direction and the propagation directions of the wavelength-multiplexed beams. The fifth element is a first dispersive element configured to rotate a propagation direction of light of each wavelength included in each of the first and second wavelength-multiplexed beams around an axis along the first direction depending upon the wavelength, in a plane spanned by the propagation directions of the first and second wavelength-multiplexed beams output from the second element and the second direction, thereby to generate each of a plurality of first dispersed beams and a plurality of second dispersed beams characterized by wavelengths. The sixth element includes a fourth optical power element configured to converge each of the first and second dispersed beams and align propagation directions of the first and second dispersed beams with each other, in a plane spanned by the propagation directions of the first and second dispersed beams output from the fifth element and the second direction. The seventh element is first and second optical deflectors configured to rotate each of the first and second dispersed beams around an axis along a third direction perpendicular to the first direction, in a plane spanned by the propagation directions of the first and second dispersed beams output from the sixth element and the first direction. The first and second optical deflectors are provided in juxtaposition in the first direction. The eighth element includes a fifth optical power element configured to rotate each of the first and second dispersed beams output from the seventh element around an axis along a fourth direction perpendicular to the third direction depending upon the wavelength, in a plane spanned by the propagation directions of the first and second dispersed beams output from the seventh element and the third direction. The ninth element is a second dispersive element configured to multiplex each of the first and second dispersed beams, in a plane spanned by the propagation directions of the first and second dispersed beams output from the eighth element and the third direction, to generate first and second multiplexed beams. The tenth element is comprised of the eleventh and twelfth elements and is an anamorphic converter configured to convert an aspect ratio of beam spots of the first and second multiplexed beams. The eleventh element includes sixth and seventh optical power elements configured to converge the first and second multiplexed beams in a plane spanned by propagation directions of the first and second multiplexed beams and the fourth direction. The twelfth element includes an eighth optical power element configured to converge the first and second multiplexed beams in a plane spanned by the propagation directions of the first and second multiplexed beams and the third direction. The thirteenth element includes first and second output ports configured to output the first and second multiplexed beams, respectively, output from the tenth element. The first element forms first and second optical apertures to output the first and second dispersed beams, respectively, so that propagation angles of the first and second dispersed beams are different from each other in a second plane spanned by the propagation directions of the first and second dispersed beams and the first direction, at a focal position on the fifth element side of the sixth element. The first and second dispersed beams having propagated at the respective angles different from each other in the second plane are individually coupled to the first and second optical deflectors, respectively.

BRIEF DESCRIPTION OF THE DRAWINGS

FIG. 4 is a side view showing an enlargement of a configuration of a light output section.

DETAILED DESCRIPTION OF THE EMBODIMENTS

One embodiment of the optical path control device according to the one aspect of the present invention will be described below in detail with reference to the drawings. In the description of the drawings, identical elements or equivalent elements will be denoted by the same reference signs, without redundant description.

First Embodiment

Figure 1:
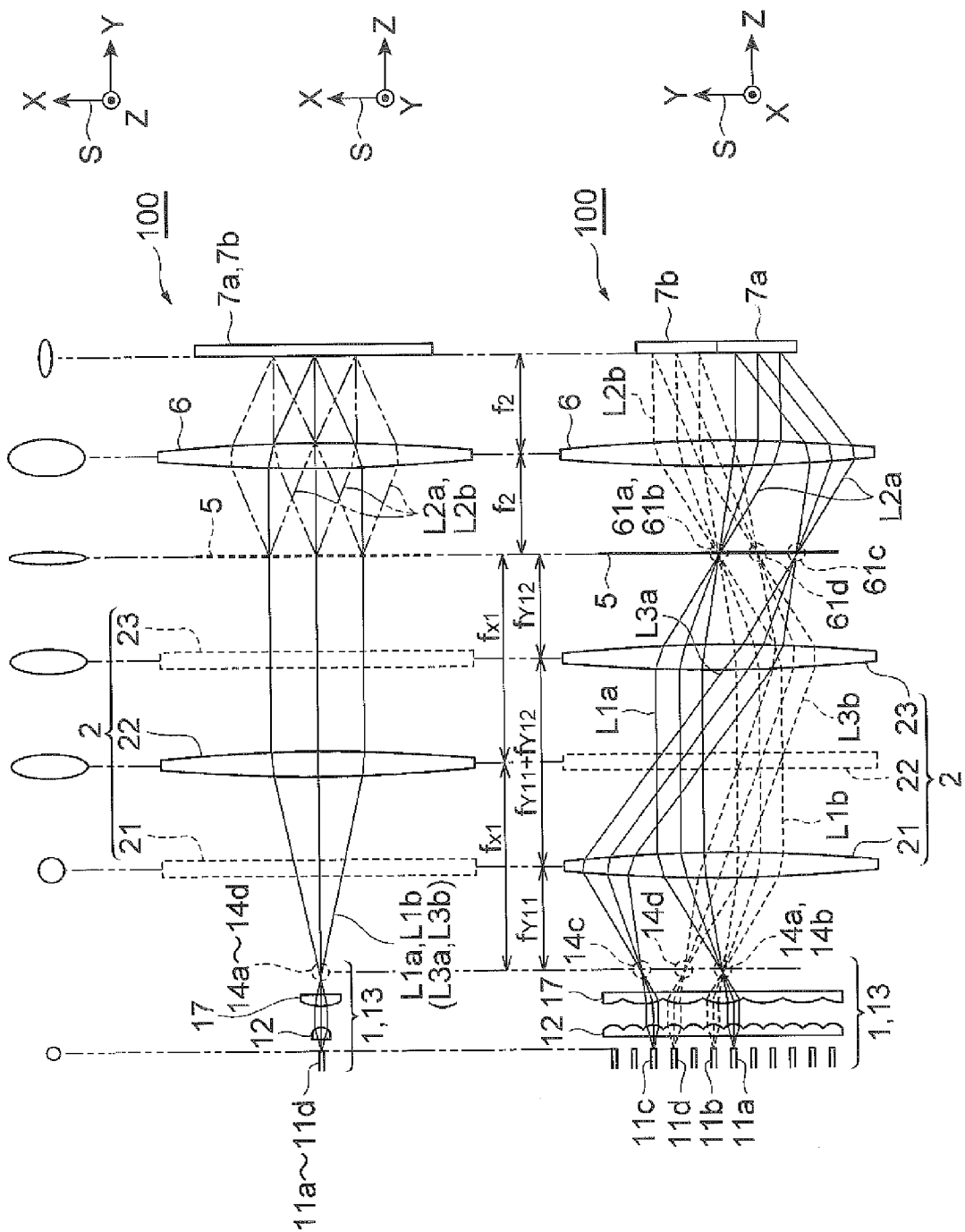
FIGS. 1A to 1C are schematic views showing a configuration of the first embodiment of the optical path control device according to the one aspect of the present invention.

FIGS. 1A to 1C are schematic views showing the configuration of the first embodiment of the optical path control device according to the one aspect of the present invention. An orthogonal coordinate system S is illustrated in FIGS. 1A to 1C. FIG. 1A is a view showing beam spots of beams propagating in the optical path control device, when viewed from the Z-axis direction of the orthogonal coordinate system S (light propagation direction). FIG. 1B is a side view of the optical path control device viewed from the Y-axis direction of the orthogonal coordinate system S. FIG. 1C is a side view of the optical path control device viewed from the X-axis direction of the orthogonal coordinate system S.

As shown in FIGS. 1A to 1C, the optical path control device 100 of the present embodiment has a light input section 1, an anamorphic converter 2, a dispersive element 5, an optical power element 6, optical deflectors 7a and 7b, and a light output section 13. To the light input section 1, wavelength-multiplexed beams L1a, L1b are input from the outside of the optical path control device 100. Each of the wavelength-multiplexed beams L1a, L1b travels through the anamorphic converter 2, dispersive element 5, and optical power element 6 in this order, is then deflected (reflected) by either of the optical deflectors 7a and 7b, and travels through the optical power element 6, dispersive element 5, and anamorphic converter 2 in this order to be output from the light output section 13.

The optical power element stated herein is, for example, a transmissive element such as a spherical lens or a cylindrical lens, or, a reflective element such as a spherical mirror or a concave mirror, and is an element having an optical power at least in one direction. The optical power refers to a capability of converging or collimating light passing through the optical power element. The closer the condensing position of the optical power element, the larger the optical power thereof herein. In FIGS. 1A to 1C, each optical power element is illustrated in a convex lens shape in a plane where it has the optical power and in a linear shape in a plane where it has no optical power.

Figure 2:
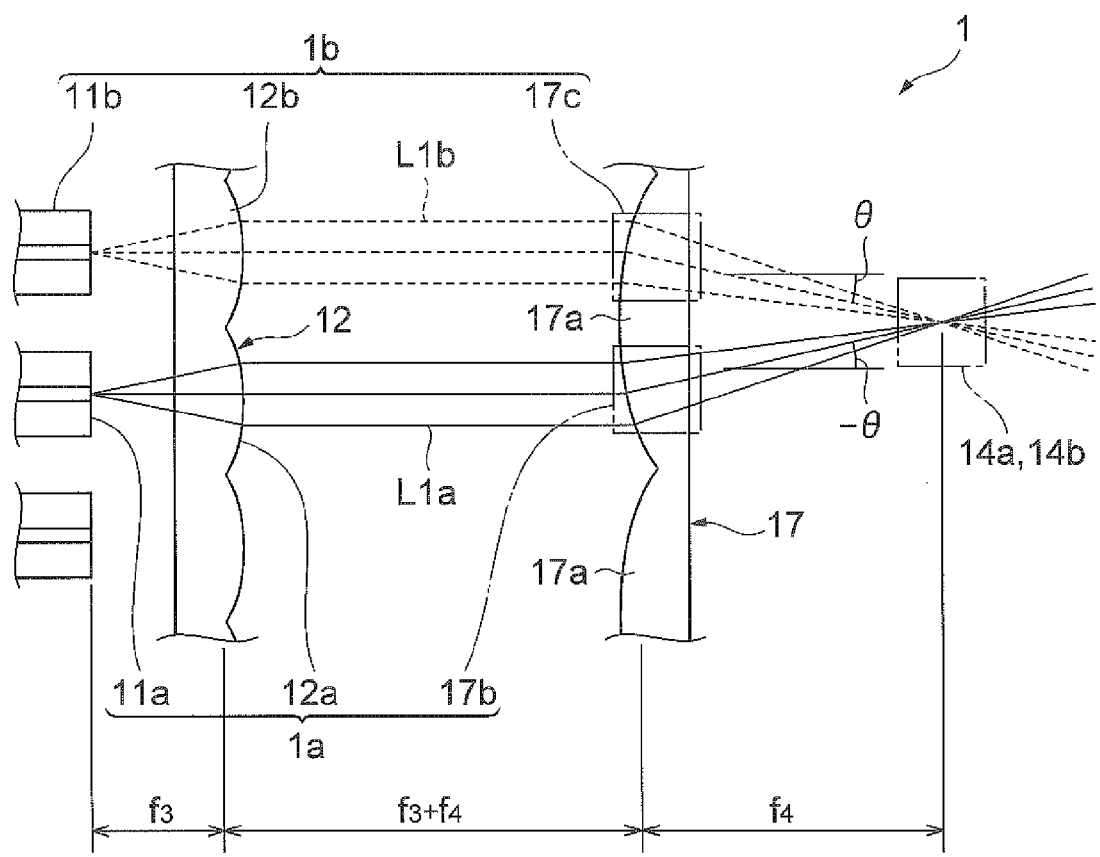
FIG. 2 is a side view showing an enlargement of a configuration of a light input section.

The light input section 1 constitutes the first element of the optical path control device according to the one aspect of the present invention. FIG. 2 is a side view showing an enlargement of the configuration of the light input section 1. The light input section 1 shown in FIG. 2 has the configuration based on an infinite conjugate system. The light input section 1 has one or more first input ports 1a and one or more second input ports 1b. In the present embodiment, the input ports 1a, 1b are arranged in juxtaposition in the Y-axis direction (first direction). The input port 1a is a port to which a first wavelength-multiplexed beam L1a input. The input port 1b is a port to which a second wavelength-multiplexed beam L1b is input.

The input port 1a includes an optical fiber 11a, an optical power element 12a, and a portion 17b of an optical power element 17a. The wavelength-multiplexed beam L1a is output from an end face of the optical fiber 11a and then is collimated by the optical power element 12a. Thereafter, the wavelength-multiplexed beam L1a passes through the portion 17b off the central axis of the optical power element 17a to be condensed and inclined with its optical axis at an angle of −θ° relative to the Z-axis.

The input port 1b includes an optical fiber 11b, an optical power element 12b, and another portion 17c of the optical power element 17a. The wavelength-multiplexed beam L1b is output from an end face of the optical fiber 11b and then is collimated by the optical power element 12b. Thereafter, the wavelength-multiplexed beam L1b passes through the portion 17c off the central axis of the optical power element 17a on the opposite side to the wavelength-multiplexed beam L1a, to be condensed and inclined with its optical axis at an angle of θ° relative to the Z-axis.

Respective condensing points of the wavelength-multiplexed beams L1a, L1b by the optical power element 17a are located at third and fourth optical apertures 14a, 14b, respectively. The optical apertures 14a, 14b are formed by the respective input ports 1a, 1b and are optical apertures that output the respective wavelength-multiplexed beams L1a, L1b so that the propagation angles (−θ, θ) of the respective wavelength-multiplexed beams L1a, L1b are different from each other in the YZ plane (second plane) spanned by the propagation directions of the wavelength-multiplexed beams L1a, L1b, i.e., the Z-axis direction and the Y-axis direction (first direction). The optical apertures 14a, 14b are formed at the focal position on the light input section 1 side of below-described optical power element 21. The optical apertures 14a, 14b are superimposed on each other in the example shown in FIGS. 1A to 1C and FIG. 2, but the optical apertures 14a, 14b may be formed at respective positions different from each other.

As shown in FIG. 2, the optical power elements 12a and 12b are integrally formed in the present embodiment to constitute a lens array 12. Furthermore, a plurality of optical power elements 17a are integrally formed to constitute a lens array 17. The optical power elements 12a and 12b may be separated from each other and the plurality of optical power elements 17a may be separated from each other. The optical power element 17a corresponds to the tenth optical power element of the optical path control device according to the one aspect of the present invention.

In an example, the distance between the end faces of the optical fibers 11a, 11b and the optical power elements 12a, 12b is equal to the focal length $f_3$ of the optical power elements 12a, 12b. In an example, the distance between the optical power elements 12a, 12b and the optical power element 17 is equal to the sum ($f_3+f_4$) of the focal length $f_3$ of the optical power elements 12a, 12b and the focal length $f_4$ of the optical power element 17. Furthermore, the distance between the optical power element 17 and the optical apertures 14a, 14b is equal to the focal length $f_4$ of the optical power element 17.

Reference is made again to FIGS. 1A to 1C. The anamorphic converter 2 accepts the wavelength-multiplexed beams L1a, L1b input from the light input section 1, converts the aspect ratio of beam spots thereof, and then outputs the resultant beams. More specifically, the anamorphic converter 2 converts the aspect ratio of the beam spots of the wavelength-multiplexed beams L1a, L1b so that the spot size in the X-axis direction (second direction) is larger than the spot size in the Y-axis direction of the wavelength-multiplexed beams L1a, L1b, at a pre-stage of the dispersive element 5. The anamorphic element 2 constitutes the second element of the optical path control device according to the one aspect of the present invention.

The anamorphic converter 2 has optical power elements 21 to 23. The optical power elements 21 to 23 are arranged in this order on the optical path from the light input section 1 to the dispersive element 5. The optical power element 21 accepts the wavelength-multiplexed beams L1a, L1b input from the light input section 1 and propagating while being expanded, and collimates the wavelength-multiplexed beams L1a, L1b in a plane spanned by the propagation directions of the wavelength-multiplexed beams L1a, L1b and the Y-axis direction (or in the YZ plane). The distance between the aforementioned optical apertures 14a, 14b of the light input section 1 and the optical power element 21 is equal to the focal length $f_{Y11}$ of the optical power element 21 in the YZ plane. In other words, the optical apertures 14a, 14b are located at the focal point on the light input section 1 side of the optical power element 21.

On the other hand, the optical power element 21 maintains the expanding state of the wavelength-multiplexed beams L1a, L1b without change, in a plane spanned by the propagation directions of the wavelength-multiplexed beams L1a, L1b and the X-axis direction (or in the XZ plane). Namely, the optical power element 21 has an optical power in the YZ plane but has no optical power in the XZ plane. The optical power element 21 to be used herein can be, for example, a cylindrical lens or the like.

The optical power element 22 accepts the wavelength-multiplexed beams L1a, L1b output from the optical power element 21 and collimates the wavelength-multiplexed beams L1a, L1b in the plane spanned by the propagation directions of the wavelength-multiplexed beams L1a, L1b and the X-axis direction (or in the XZ plane). The distance between the aforementioned optical apertures 14a, 14b of the light input section 1 and the optical power element 22 is equal to the focal length $f_{X1}$ of the optical power element 22 in the XZ plane. On the other hand, the optical power element 22 maintains the collimated state of the wavelength-multiplexed beams L1a, L1b in the plane spanned by the propagation directions of the wavelength-multiplexed beams L1a, L1b and the Y-axis direction (or in the YZ plane). Namely, the optical power element 22 has an optical power in the XZ plane but has no optical power in the YZ plane. The optical power element 22 to be used herein can be, for example, a cylindrical lens or the like.

The optical power element 23 accepts the wavelength-multiplexed beams L1a, L1b output from the optical power element 22 and converges the wavelength-multiplexed beams L1a, L1b in the plane spanned by the propagation directions of the wavelength-multiplexed beams L1a, L1b and the Y-axis direction (or in the YZ plane). The distance between the optical power element 21 and the optical power element 23 is equal to the sum ($f_{Y11}+f_{Y12}$) of the focal length $f_{Y11}$ of the optical power element 21 and the focal length $f_{Y12}$ of the optical power element 23 in the YZ plane. On the other hand, the optical power element 23 maintains the collimated state of the wavelength-multiplexed beams L1a, L1b in the plane spanned by the propagation directions of the wavelength-multiplexed beams L1a, L1b and the X-axis direction (or in the XZ plane). Namely, the optical power element 23 has an optical power in the YZ plane but has no optical power in the XZ plane. The optical power element 23 to be used herein can be, for example, a cylindrical lens or the like.

In this manner, the optical power elements 21, 23 converge the wavelength-multiplexed beams L1a, L1b in the plane spanned by the propagation directions of the wavelength-multiplexed beams L1a, L1b and the Y-axis direction and the optical power element 22 collimates the wavelength-multiplexed beams L1a, L1b in the plane spanned by the propagation directions of the wavelength-multiplexed beams L1a, L1b and the X-axis direction. As a result, the wavelength-multiplexed beams L1a, L1b come to have the spot size larger in the X-axis direction than the spot size in the Y-axis direction, at the pre-stage of the dispersive element 5.

The optical power elements 21, 23 correspond to the first and second optical power elements of the optical path control device according to the one aspect of the present invention and constitute the third element. The optical power element 22 corresponds to the third optical power element of the optical path control device according to the one aspect of the present invention and constitutes the fourth element. The optical power of the optical power element 21 and the optical power of the optical power element 23 are equal to each other. The optical power element 22 is located at the confocal position of the optical power element 21 and the optical power element 23.

The dispersive element 5 is arranged at the condensing position of the optical power element 23 in the plane spanned by the propagation directions of the wavelength-multiplexed beams L1a, L1b output from the anamorphic converter 2 and the Y-axis (or in the YZ plane). At the same time, the dispersive element 5 is arranged at the rear focal point of the optical power element 22 in the plane spanned by the propagation directions of the wavelength-multiplexed beams L1a, L1b output from the anamorphic converter 2 and the X-axis (or in the XZ plane). The dispersive element 5 rotates the propagation direction of light of each wavelength included in the wavelength-multiplexed beams L1a, L1b around an axis along the Y-axis direction depending upon the wavelength, in the plane spanned by the propagation directions of the wavelength-multiplexed beams L1a, L1b output from the anamorphic converter 2 and the X-axis (or in the XZ plane). This action results in dispersing the wavelength-multiplexed beam L1a wavelength by wavelength and generating a plurality of first dispersed beams L2a characterized by wavelengths. Similarly, the wavelength-multiplexed beam L1b is dispersed wavelength by wavelength to generate a plurality of second dispersed beams L2b characterized by wavelengths. Namely, the dispersive element 5 disperses the wavelength-multiplexed beams L1a, L1b into the plurality of dispersed beams L2a, L2b, respectively, along the X-axis direction and outputs them. The dispersive element 5 is separated by the focal length $f_{x1}$ of the optical power element 22 from the optical power element 22 and by the focal length $f_{y12}$ of the optical power element 23 from the optical power element 23. It is noted that FIG. 1B shows three dispersed beams with respective wavelengths different from each other, as the dispersed beams L2a or L2b and FIG. 1C shows only one dispersed beam out of them as a representative. The dispersive element 5 to be used herein is, for example, a diffraction grating or the like. The dispersive element 5 corresponds to the first dispersive element of the optical path control device according to the one aspect of the present invention and constitutes the fifth element.

The optical power element 6 converges each of the dispersed beams L2a, L2b and aligns the propagation directions of the dispersed beams L2a, L2b with each other, in the plane spanned by the propagation directions of the dispersed beams L2a, L2b output from the dispersive element 5 and the X-axis direction (or in the XZ plane). On the other hand, the optical power element 6 collimates each of the dispersed beams L2a, L2b propagating while expanding, in the plane spanned by the propagation directions of the dispersed beams L2a, L2b output from the dispersive element 5 and the Y-axis direction (or in the YZ plane). By this, the beam spot of each of the dispersed beams L2a, L2b comes to have a flattened shape relatively larger in the Y-axis direction than in the X-axis direction on the optical deflectors 7a and 7b. In this manner, the optical power element 6 has an optical power in both of the XZ plane and the YZ plane. The optical power element 6 to be used herein can be, for example, a spherical lens or the like. The optical power element 6 corresponds to the fourth optical power element of the optical path control device according to the one aspect of the present invention and constitutes the sixth element.

Figure 3:
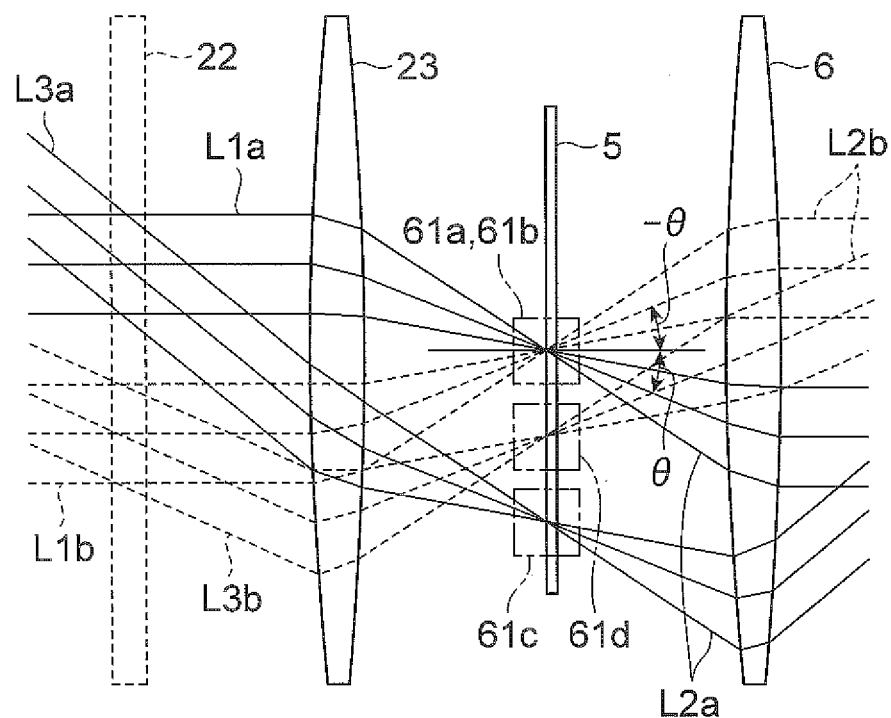
FIG. 3 is a side view showing an enlargement of a configuration around optical apertures.

A first optical aperture 61a and a second optical aperture 61b are formed at the focal position on the dispersive element 5 side of the optical power element 6. FIG. 3 is a side view showing an enlargement of the configuration around the optical apertures 61a, 61b. The optical apertures 61a, 61b are optical apertures which output the dispersed beams L2a, L2b, respectively, so that the propagation angles (θ, −θ) of the dispersed beams L2a, L2b are different from each other, in the YZ plane (second plane) spanned by the propagation directions of the dispersed beams L2a, L2b and the Y-axis. In the present embodiment, since the distance between the dispersive element 5 and the optical power element 6 is equal to the focal length $f_2$ of the optical power element 6, the optical apertures 61a, 61b are superimposed on the dispersive element 5. The optical apertures 61a, 61b are located at the focal point on the dispersive element 5 side of the optical power element 23, which is the condensing points of the wavelength-multiplexed beams L1a, L1b by the optical power element 23. Although the optical apertures 61a, 61b are superimposed on each other in the example shown in FIGS. 1A to 1C, the optical apertures 61a, 61b may be formed at respective positions different from each other. Furthermore, the beam diameters of the dispersed beams L2a, L2b at the optical apertures 61a, 61b can be readily adjusted by the optical power element 17 of the light input section 1.

As described above, the input ports 1a, 1b form the optical apertures 14a, 14b and the anamorphic converter 2 is disposed as a post-stage of the optical apertures 14a, 14b. In this case, the wavelength-multiplexed beams L1a, L1b are transferred to the dispersed beams L2a, L2b while the propagation angles (−θ, θ) of the wavelength-multiplexed beams L1a, L1b in the YZ plane (second plane) at the optical apertures 14a, 14b are inverted to the propagation angles (θ, −θ) of the dispersed beams L2a, L2b in the YZ plane (second plane) at the optical apertures 61a, 61b by the anamorphic converter 2. Therefore, the optical apertures 61a, 61b can be regarded as those formed by the input ports 1a, 1b, respectively.

The optical deflectors 7a and 7b are arranged at the condensing positions of the dispersed beams L2a, L2b in the plane spanned by the propagation directions of the dispersed beams L2a, L2b output from the optical power element 6 and the X-axis direction (or in the XZ plane). In other words, the optical deflectors 7a and 7b are arranged at the focal length $f_2$ of the optical power element 6 from the optical power element 6. Furthermore, the optical deflectors 7a and 7b are arranged in juxtaposition in the Y-axis direction. The plurality of dispersed beams L2a output from the optical power element 6 are incident to the optical deflector 7a and the plurality of dispersed beams L2b output from the optical power element 6 are incident to the optical deflector 7b.

The dispersed beams L2a, L2b traveling toward the optical deflectors 7a and 7b are beams with their propagation angles (θ, −θ) different from each other at the optical apertures 61a, 61b, as described above. Therefore, the dispersed beams L2a, L2b each pass at their respective positions different from each other in the optical power element 6 to be individually coupled to the optical deflectors 7a, 7b, respectively.

The optical deflectors 7a and 7b have a plurality of light deflection factor elements (pixels) pixelated to be arranged in the Y-axis direction. The optical deflector 7a independently modulates each of the plurality of dispersed beams L2a output from the optical power element 6. Similarly, the optical deflector 7b independently modulates each of the plurality of dispersed beams L2b output from the optical power element 6. By this action, the optical deflectors 7a and 7b rotate the dispersed beams L2a, L2b around an axis along the X-axis direction (third direction) perpendicular to the Y-axis direction, in the plane spanned by the dispersed beams L2a, L2b output from the optical power element 6 and the Y-axis direction (or in the YZ plane). In an example, the optical deflectors 7a and 7b reflect the dispersed beams L2a, L2b into directions approximately opposite to the directions of incidence of the dispersed beams L2a, L2b and deflect the dispersed beams L2a, L2b by controlling angles of emergence after the reflection.

In the optical deflectors 7a and 7b, the pixels are arranged in a two-dimensional array form and, among them, the pixels (light deflection factor elements) contributing to the deflection of the dispersed beams L2a, L2b are those arranged in the Y-axis direction. The optical deflectors 7a and 7b to be used herein can be, for example, LCOS, DMD (Digital Micromirror Device), or the like. Furthermore, the optical deflectors 7*a* and 7*b* may be separate deflection regions included in one light deflecting element or may be realized by two light deflecting elements independent of each other. The optical deflectors 7*a* and 7*b* constitute the seventh element of the optical path control device according to the one aspect of the present invention.

The dispersed beams L2*a*, L2*b* output as deflected by the optical deflectors 7*a* and 7*b* travel through the optical power element 6, dispersive element 5, and anamorphic converter 2 in this order to be output from the light output section 13. The optical power element 6 rotates each of the dispersed beams L2*a*, L2*b* output from the optical deflectors 7*a* and 7*b* around an axis along the Y-axis direction (fourth direction) perpendicular to the X z-axis direction depending upon its wavelength, in the plane spanned by the propagation directions of the dispersed beams L2*a*, L2*b* output from the optical deflectors 7*a* and 7*b* and the X-axis direction (or in the XZ plane). This causes each of the dispersed beams L2*a*, L2*b* output from the optical deflectors 7*a* and 7*b* to be condensed at a predetermined position of the dispersive element 5, in the X-axis direction.

On the other hand, the optical power element 6 converges each of the dispersed beams L2*a*, L2*b* output from the optical deflectors 7*a* and 7*b*, in the plane spanned by the propagation directions of the dispersed beams L2*a*, L2*b* output from the optical deflectors 7*a* and 7*b* and the Y-axis direction (or in the YZ plane). This causes each of the dispersed beams L2*a*, L2*b* output from the optical deflectors 7*a* and 7*b* to be condensed on the dispersive element 5 and at either of optical apertures 61*c*, 61*d*, respectively, in the Y-axis direction. The optical power element 6 corresponds to the fifth optical power element of the optical path control device according to the one aspect of the present invention and constitutes the eighth element.

The dispersive element 5 multiplexes arbitrary dispersed beams L2*a* out of the plurality of dispersed beams L2*a*, in the plane spanned by the propagation directions of the dispersed beams L2*a* output from the optical power element 6 and the X-axis direction (or in the XZ plane) to generate a multiplexed beam L3*a*. Namely, the dispersive element 5 combines arbitrary two or more dispersed beams L2*a* to be output from one light output port (described below), together to generate the multiplexed beam L3*a*. Similarly, the dispersive element 5 multiplexes arbitrary dispersed beams L2*b* out of the plurality of dispersed beams L2*b*, in the plane spanned by the propagation directions of the dispersed beams L2*b* output from the optical power element 6 and the X-axis direction (or in the XZ plane) to generate a multiplexed beam L3*b*. Namely, the dispersive element 5 combines arbitrary two or more dispersed beams L2*b* to be output from another light output port, together to generate the multiplexed beam L3*b*. The dispersive element 5 corresponds to the second dispersive element of the optical path control device according to the one aspect of the present invention and constitutes the ninth element.

The anamorphic converter 2 accepts the multiplexed beams L3*a*, L3*b* output from the dispersive element 5, converts the aspect ratio of the beam spots thereof, and outputs the resultant beams. More specifically, the anamorphic converter 2 converts the aspect ratio of the beam spots of the multiplexed beams L3*a*, L3*b* so that the spot size in the Y-axis direction is approximately equal to the spot size in the X-axis direction of the multiplexed beams L3*a*, L3*b*, between the dispersive element 5 and the light output section 13. The anamorphic converter 2 constitutes the tenth element of the optical path control device according to the one aspect of the present invention.

The anamorphic converter 2 has the optical power elements 23, 22, 21, as described above, and the optical power elements 23, 22, 21 are arranged in this order on the optical path from the dispersive element 5 to the light output section 13. The optical power element 23 collimates the multiplexed beams L3*a*, L3*b*, in the plane spanned by the propagation directions of the multiplexed beams L3*a*, L3*b* output from the dispersive element 5 and the Y-axis direction (or in the YZ plane). On the other hand, the optical power element 23 maintains the collimated state of the multiplexed beams L3*a*, L3*b*, in the plane spanned by the propagation directions of the multiplexed beams L3*a*, L3*b* output from the dispersive element 5 and the X-axis direction (or in the XZ plane).

The optical power element 22 converges the multiplexed beams L3*a*, L3*b*, in the plane spanned by the multiplexed beams L3*a*, L3*b* output from the optical power element 23 and the X-axis direction. On the other hand, the optical power element 22 maintains the collimated state of the multiplexed beams L3*a*, L3*b*, in the plane spanned by the propagation directions of the multiplexed beams L3*a*, L3*b* output from the optical power element 23 and the Y-axis direction (or in the YZ plane).

The optical power element 21 converges the multiplexed beams L3*a*, L3*b*, in the plane spanned by the propagation directions of the multiplexed beams L3*a*, L3*b* output from the optical power element 22 and the Y-axis direction (or in the YZ plane). On the other hand, the optical power element 21 maintains the converging state of the multiplexed beams L3*a*, L3*b*, in the plane spanned by the propagation directions of the multiplexed beams L3*a*, L3*b* output from the optical power element 22 and the X-axis direction (or in the XZ plane).

In this manner, the optical power elements 23, 21 converge the multiplexed beams L3*a*, L3*b* in the plane spanned by the propagation directions of the multiplexed beams L3*a*, L3*b* and the Y-axis direction (or in the YZ plane) and the optical power element 22 converges the multiplexed beams L3*a*, L3*b* in the plane spanned by the propagation directions of the multiplexed beams L3*a*, L3*b* and the X-axis direction (or in the XZ plane). As a result, the multiplexed beams L3*a*, L3*b* come to have the spot size in the Y-axis direction approximately equal to the spot size in the X-axis direction, at a pre-stage of the light output section 13. In this manner, the multiplexed beams L3*a*, L3*b* with the aspect ratio of the beam spots thereof converted by the anamorphic converter 2 reach the light output section 13.

The optical power elements 23, 21 correspond to the sixth and seventh optical power elements of the optical path control device according to the one aspect of the present invention and constitute the eleventh element. The optical power element 22 corresponds to the eighth optical power element of the optical path control device according to the one aspect of the present invention and constitutes the twelfth element.

The light output section 13 constitutes the thirteenth element of the optical path control device according to the one aspect of the present invention. FIG. 4 is a side view showing an enlargement of the configuration of the light output section 13. The light output section 13 has one or more first output ports 13*a*, and one or more second output ports 13*b*. In the present embodiment, the output ports 13*a*, 13*b*, together with the input ports 1*a*, 1*b*, are arranged in juxtaposition in the Y-axis direction (first direction). The output port 13*a* outputs the multiplexed beam L3*a* to the outside of the optical path control device 100. The output port 13*b* outputs the multiplexed beam L3*b* to the outside of the optical path control device 100.

The output port 13a includes an optical fiber 11c, an optical power element 12c, and a portion 17e of an optical power element 17d. The multiplexed beam L3a passes through the portion 17e off the central axis of the optical power element 17d to be collimated and changed in the angle of the optical axis thereof by θ° relative to the Z-axis. This makes the propagation angle of the multiplexed beam L3a relative to the Z-axis return to 0°. Thereafter, the multiplexed beam L3a is condensed by the optical power element 12c to enter the end face of the optical fiber 11c.

The output port 13b includes an optical fiber 11d, an optical power element 12d, and a portion 17f of an optical power element 17d. The multiplexed beam L3b passes through the portion 17f off the central axis of the optical power element 17d to be collimated and changed in the angle of the optical axis thereof by −θ° relative to the Z-axis. This makes the propagation angle of the multiplexed beam L3b relative to the Z-axis return to 0°. Thereafter, the multiplexed beam L3b is condensed by the optical power element 12d to enter the end face of the optical fiber 11d.

Respective condensing points of the multiplexed beams L3a, L3b having passed through the optical power element 21 are located at optical apertures 14c, 14d, respectively. At the optical apertures 14c, 14d, the propagation angles of the multiplexed beams L3a, L3b are also different from each other in the YZ plane (second plane) spanned by the propagation directions of the multiplexed beams L3a, L3b, i.e., the Z-axis direction and the Y-axis direction (first direction). The optical apertures 14c, 14d are formed at the focal positions on the optical power element 21 side of the optical power elements 12c, 12d. The optical apertures 14c, 14d are formed at the respective positions different from each other in the example shown in FIG. 4, but the optical apertures 14c, 14d may be arranged to be superimposed on each other.

The optical power elements 12c and 12d in the present embodiment are formed integrally with the optical power elements 12a and 12b of the light input section 1, to constitute the lens array 12. Furthermore, the optical power elements 17d are formed integrally with the optical power elements 17a of the light input section 1, to constitute the lens array 17. However, the optical power elements 12c, 12d and the optical power elements 17d each may be arranged to be individually separated.

In the optical path control device 100, as described above, the light input section 1 includes the two input ports 1a and 1b and, the wavelength-multiplexed beams L1a and L1b, i.e., the wavelength-multiplexed beams belonging to two groups are input to the input ports 1a and 1b, respectively. The wavelength-multiplexed beams L1a, L1b are converged in the Y-axis direction and collimated in the X-axis direction by the anamorphic converter 2. Namely, the beam spots of the wavelength-multiplexed beams L1a, L1b from the light input section 1 are converted into the flattened shape relatively larger in the X-axis direction than in the Y-axis direction, by the anamorphic converter 2. Then, the wavelength-multiplexed beams L1a, L1b of the flattened shape output from the anamorphic converter 2 are rotated around the axis along the Y-axis direction depending upon the wavelengths by the dispersive element 5 to be dispersed into the plurality of dispersed beams L2a and the plurality of dispersed beams L2b as characterized by the wavelengths.

Thereafter, the dispersed beams L2a, L2b propagate while their beam spots are expanded in the Y-axis direction, and are converged in the X-axis direction by the optical power element 6 to impinge on the optical deflectors 7a and 7b, respectively. This makes the spot size of the dispersed beams L2a, L2b impinge on the optical deflectors 7a and 7b relatively larger in the Y-axis direction than in the X-axis direction, with the result of inversion of the aspect ratio. The dispersed beams L2a, L2b impinging on the respective optical deflectors 7a and 7b are deflected by the optical deflectors 7a and 7b, respectively.

In this manner, in the optical path control device 100, the dispersed beams L2a, L2b of the flattened shape with the spot size relatively larger in the arrangement direction (Y-axis direction) of the light deflection factor elements for deflection of light are incident to the optical deflectors 7a and 7b. Therefore, the dispersed beams L2a, L2b can be precisely and efficiently deflected. Particularly, in the present embodiment, the conversion of spot size is carried out at the pre-stage of the dispersive element 5. This increases degrees of freedom for optical design; for example, it becomes feasible to arrange the various optical components and others at the post-stage of the dispersive element 5.

The light input section 1 in the present embodiment forms the optical apertures 61a, 61b to output the respective dispersed beams L2a, L2b so that the propagation angles of the dispersed beams L2a, L2b are different from each other in the YZ plane (second plane). Then, the dispersed beams L2a, L2b having propagated at the respective angles (θ, −θ) different from each other in the YZ plane each are individually coupled to the optical deflectors 7a, 7b, respectively. In this manner, in the present embodiment, the propagation angles of the dispersed beams L2a, L2b are different from each other, whereby the dispersed beams L2a, L2b are individually coupled to the optical deflectors 7a, 7b, respectively. Therefore, even with slight deviation of the optical axis of dispersed beams (e.g., the dispersed beams L2a) belonging to a certain group from a prescribed position, there is little incidence of the dispersed beams to the optical deflector corresponding to the other group (e.g., the optical deflector 7b), different from the configuration using the beam guide element described in Patent Literature 2, for example. In this way, the optical path control device 100 of the present embodiment can reduce crosstalk between the groups of light input/output ports.

In the present embodiment the input ports 1a, 1b are arranged in juxtaposition in the Y-axis direction, as shown in FIG. 2. In such a case, the light input section 1 may form the optical apertures 14a, 14b to output the respective wavelength-multiplexed beams L1a, L1b so that the propagation angles of the wavelength-multiplexed beams L1a, L1b are different from each other in the YZ plane (second plane), at the focal position on the light input section 1 side of the optical power element 21. In this case, the anamorphic converter 2 transfers the beams while inverting the propagation angles (−θ, θ) of the wavelength-multiplexed beams L1a, L1b in the second plane at the optical apertures 14a, 14b to the propagation angles (θ, −θ) of the dispersed beams L2a, L2b in the second plane at the optical apertures 61a, 61b. Therefore, the present embodiment can readily realize the optical apertures 61a, 61b by the simple method of controlling the propagation angles of the wavelength-multiplexed beams L1a, L1b output from the light input section 1.

In the present embodiment, as shown in FIG. 1C, the optical axes of the wavelength-multiplexed beams L1a, L1b may intersect with each other, between the optical apertures 14a, 14b and the input ports 1a, 1b in the propagation directions of the wavelength-multiplexed beams L1a, L1b. In this case, it is feasible to reduce coupling of the wavelength-multiplexed beams L1a, L1b and thus to effectively reduce crosstalk.

In the present embodiment, the focal position of the light input section 1 in the propagation directions of the wavelength-multiplexed beams L1a, L1b is coincident with the focal position on the light input section 1 side of the optical power element 21 in the foregoing directions, as shown in FIG. 1C, and the light input section 1 may let the wavelength-multiplexed beams L1a, L1b propagate at the respective angles (−θ, θ) different from each other in the YZ plane spanned by the propagation directions of the wavelength-multiplexed beams L1a, L1b and the Y-axis direction. This configuration can be readily realized, for example, by inclining the optical axes of the optical fibers 11a, 11b included in the light input section 1, or, by shifting the central axis of the optical power element 17 in the light input section 1 from the optical axes of the optical fibers 11a, 11b, as shown in FIG. 2, or, by other methods.

In the present embodiment, as shown in FIG. 1C, the light input section 1 includes the optical power element 17 configured to adjust the beam diameters of the dispersed beams L2a, L2b at the optical apertures 61a, 61b. This allows us to easily perform parameter design for reduction of crosstalk by use of the optical power element 17.

In the optical path control device 100 of the present embodiment, the optical power element 6 may be provided, for example, as an optical power element having an optical power in the plane spanned by the propagation directions of the dispersed beams L2a, L2b and the X-axis direction (or in the XZ plane) but having no optical power in the plane spanned by the propagation directions of the dispersed beams L2a, L2b and the Y-axis direction (or in the YZ plane) (e.g., a cylindrical lens or the like).

In this case, in the plane spanned by the propagation directions of the dispersed beams L2a, L2b output from the dispersive element 5 and the X-axis direction, the optical power element 6 converges each of the dispersed beams L2a, L2b and aligns the propagation directions of the dispersed beams L2a, L2b with each other. In contrast, in the plane spanned by the propagation directions of the dispersed beams L2a, L2b output from the dispersive element 5 and the Y-axis direction, the optical power element 6 maintains the expanding state of the dispersed beams L2a, L2b. Namely, the optical power element 6 converges each of the dispersed beams L2a, L2b only in the X-axis direction and enlarges at least the spot size in the Y-axis direction of the dispersed beams L2a, L2b on the optical deflectors 7a and 7b. For this reason, the aspect ratio of the beam spot of each of the dispersed beams L2a, L2b is more increased and thus it becomes feasible to make a larger number of light deflection factor elements in the optical deflectors 7a and 7b contribute to the deflection of the dispersed beams L2a, L2b. In this case, therefore, it becomes feasible to more efficiently deflect the dispersed beams L2a, L2b.

In the optical path control device 100 of the present embodiment, the optical power of the optical power element 21 is equal to the optical power of the optical power element 23. This facilitates optical design.

First Modification Example

Figure 5:
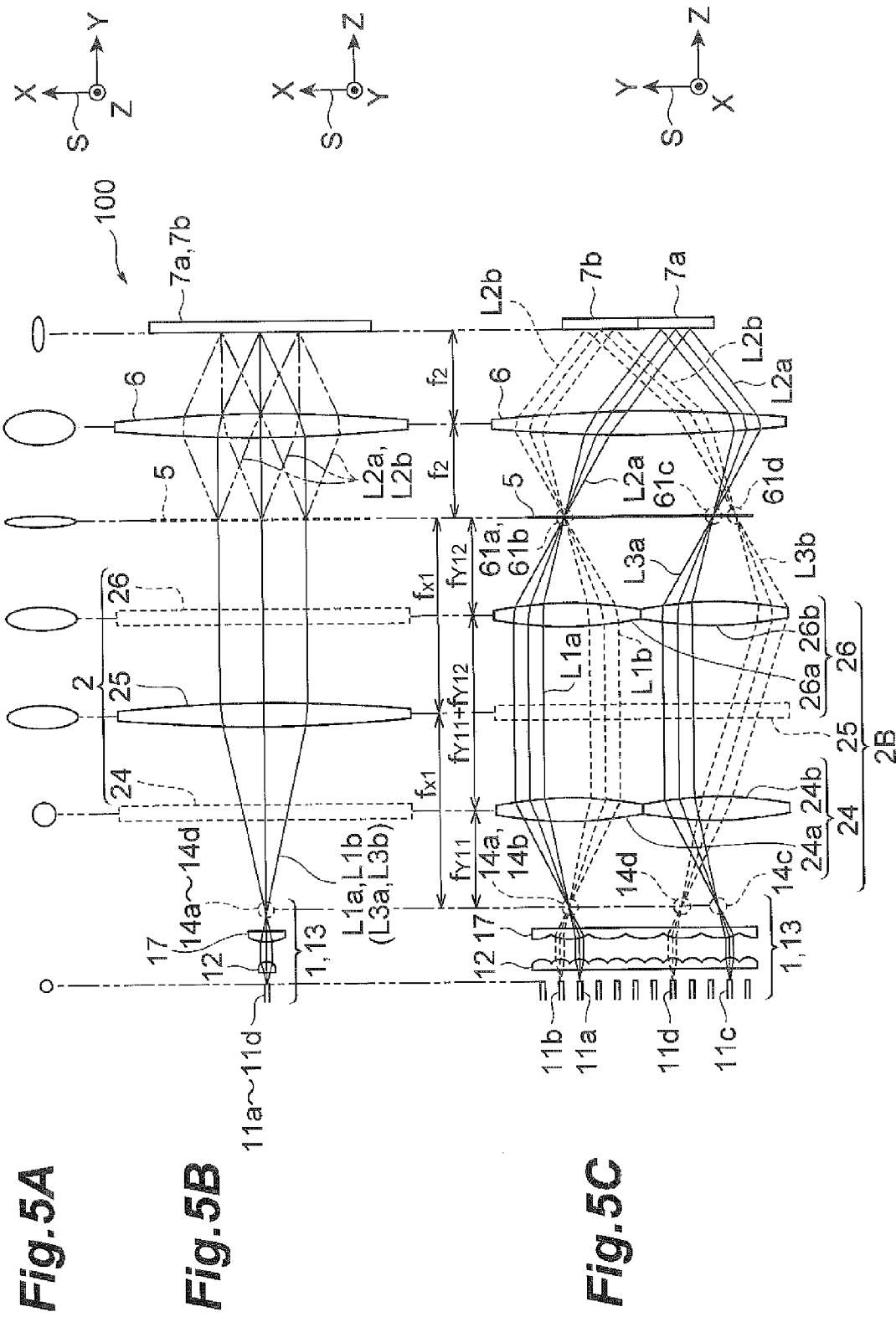
FIGS. 5A to 5C are views showing a configuration of the optical path control device according to a first modification example.

FIGS. 5A to 5C are drawings showing the configuration of the optical path control device according to the first modification example of the above-described first embodiment. The orthogonal coordinate system S is illustrated in FIGS. 5A to 5C. FIG. 5A is a view showing beam spots of beams propagating in the optical path control device, when viewed from the Z-axis direction of the orthogonal coordinate system S (light propagation direction). FIG. 5B is a side view of the optical path control device viewed from the Y-axis direction of the orthogonal coordinate system S. FIG. 5C is a side view of the optical path control device viewed from the X-axis direction of the orthogonal coordinate system S.

The present modification example is different from the first embodiment, in the configurations of the first and second optical power elements constituting the third element and the sixth and seventh optical power elements constituting the eleventh element. In the present modification example, the anamorphic converter 2B is provided instead of the anamorphic converter 2 in the first embodiment. The anamorphic converter 2B constitutes the second element and the tenth element of the optical path control device according to the one aspect of the present invention. The anamorphic converter 2B has optical power elements 24 to 26. The optical power elements 24 to 26 are arranged in this order on the optical path from the light input section 1 to the dispersive element 5. The optical power elements 24, 26 correspond to the first and second optical power elements of the optical path control device according to the one aspect of the present invention, for the wavelength-multiplexed beams L1a, L1b, and constitute the third element. Furthermore, the optical power elements 24, 26 correspond to the sixth and seventh optical power elements of the optical path control device according to the one aspect of the present invention, for the multiplexed beams L3a, L3b, and constitute the eleventh element. The optical power element 25 corresponds to the third optical power element of the optical path control device according to the one aspect of the present invention, for the wavelength-multiplexed beams L1a, L1b, and constitutes the fourth element. Furthermore, the optical power element 25 corresponds to the eighth optical power element of the optical path control device according to the one aspect of the present invention, for the multiplexed beams L3a, L3b, and constitutes the twelfth element.

The optical power elements 24 to 26 each have the same functions as the optical power elements 21 to 23, respectively, in the first embodiment and have the same relative position relationships as the optical power elements 21 to 23, respectively, with respect to the light input section 1 and light output section 13 and with respect to the dispersive element 5. However, the optical power elements 24 and 26 include a plurality of lenses arranged as divided along the Y-axis direction (e.g., lenses 24a, 24b and lenses 26a, 26b). By using the plurality of divided lenses 24a, 24b and lenses 26a, 26b in this manner, the maximum distance in the Y-axis direction can be made smaller between each of the optical axes of the wavelength-multiplexed beams L1a, L1b and the multiplexed beams L3a, L3b and the central axis of each lens, which can reduce aberration of the wavelength-multiplexed beams L1a, L1b and the multiplexed beams L3a, L3b in the Y-axis direction.

Second Modification Example

Figure 6:
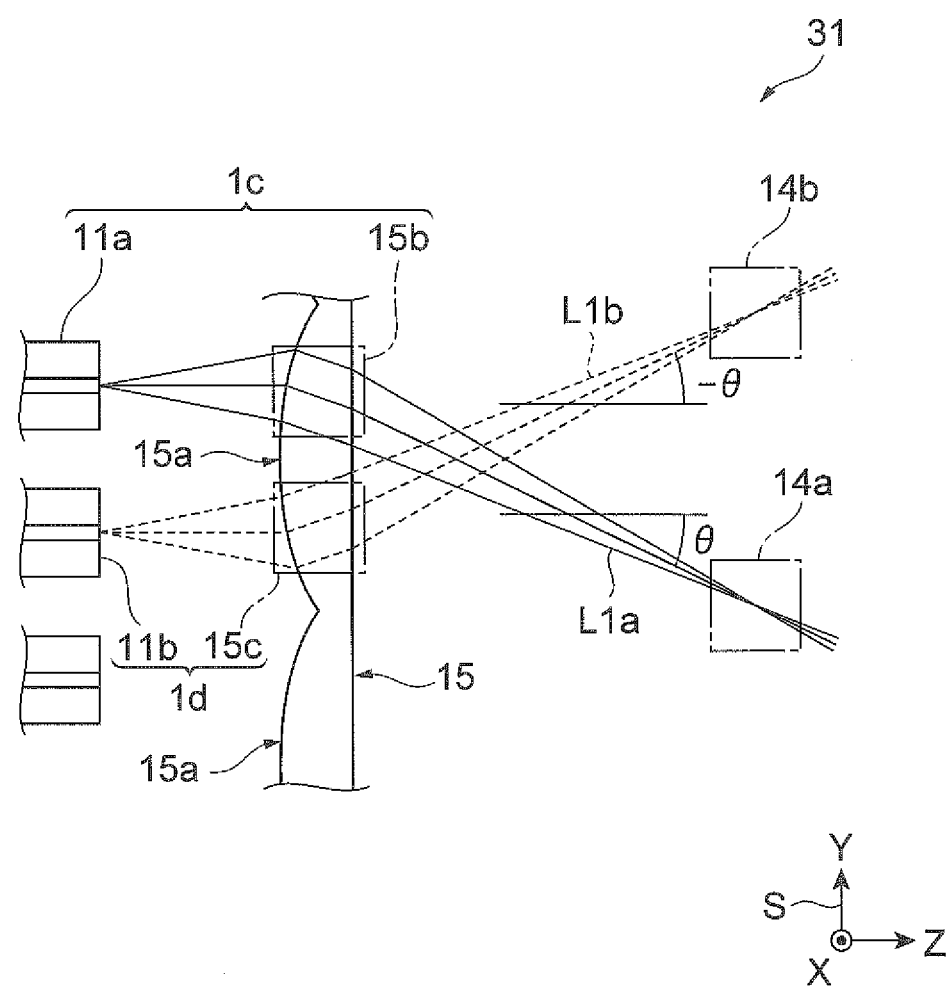
FIG. 6 is a view showing a modification example of the configuration of the light input section.
Figure 7:
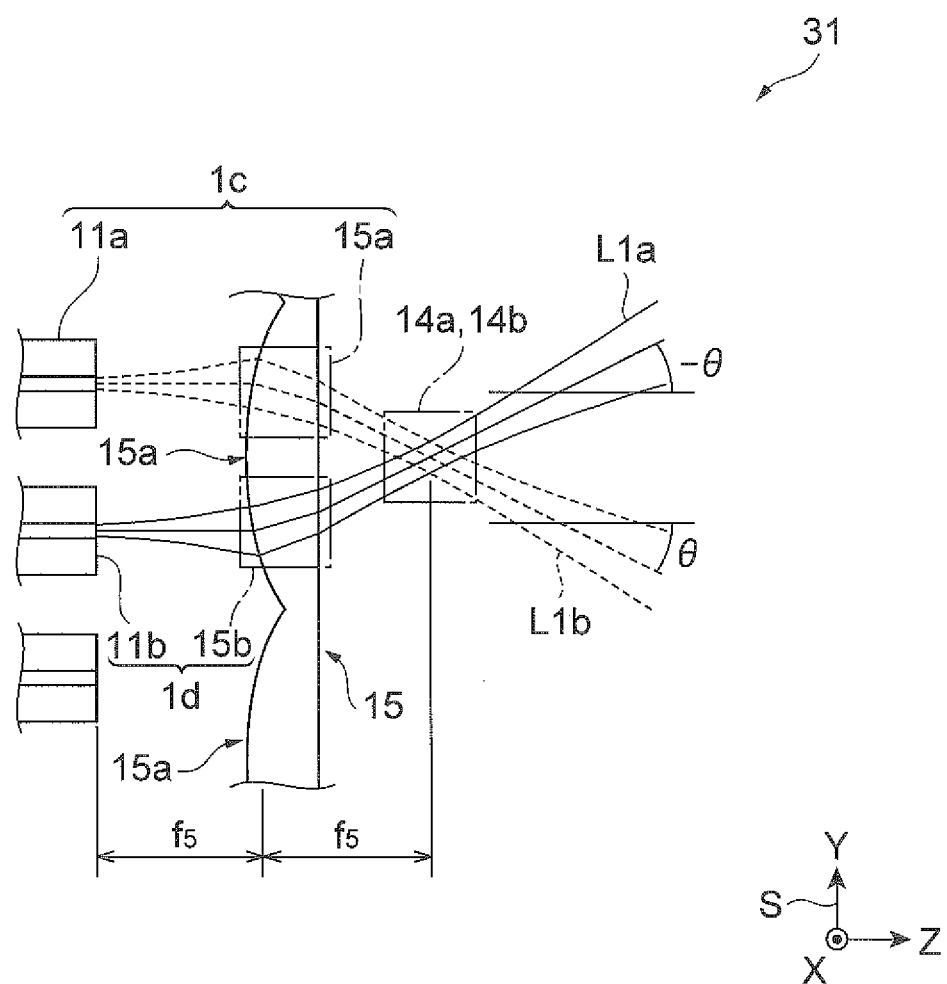
FIG. 7 is a view showing another modification example of the configuration of the light input section.

FIG. 6 and FIG. 7 are drawings showing modifications of the configuration of the light input section. The light input section 31 shown in FIG. 6 constitutes the first element of the optical path control device according to the one aspect of the present invention and has the configuration based on a unit conjugate system. The light input section 31 has one or more first input ports 1c and one or more second input ports 1d. The input ports 1c, 1d are arranged in juxtaposition in the Y-axis direction (first direction). The first wavelength-multiplexed beam L1*a* is input to the input port 1*c*. The second wavelength-multiplexed beam L1*b* is input to the input port 1*d*.

The input port 1*c* includes the optical fiber 11*a*, and a portion 15*b* of an optical element 15*a*. The wavelength-multiplexed beam L1*a* is output from the end face of the optical fiber 11*a*, and then passes through the portion 15*b* off the central axis of the optical power element 15*a* to be condensed and inclined with its optical axis at the angle of θ° relative to the Z-axis. The input port 1*d* includes the optical fiber 11*b*, and another portion 15*c* of the optical power element 15*a*. The wavelength-multiplexed beam L1*b* is output from the end face of the optical fiber 11*b*, and then passes through the portion 15*c* off the central axis of the optical power element 15*a* on the opposite side to the wavelength-multiplexed beam L1*a*, to be condensed and inclined with its optical axis at the angle of −θ° relative to the Z-axis. In the present embodiment, a plurality of optical power elements 15*a* are integrally formed to constitute a lens array 15. The plurality of optical power elements 15*a* may be arranged to be separated from each other.

FIG. 7 is a drawing showing an arrangement example based on a Gaussian optic—infinite conjugate system. In the example shown in FIG. 7, the distance between the optical fiber 11*a* and the optical power element 15*a* is coincident with the focal length $f_5$ of the optical power element 15*a* and the distance between the optical power element 15*a* and the optical apertures 14*a*, 14*b* is also coincident with the focal length $f_5$ of the optical power element 15*a*.

The light input section, when having the configuration as in the present modification example, can also suitably form the optical apertures 61*a*, 61*b* shown in FIGS. 1A to 1C. The light output section can have the same configuration as the light input section 31.

In the example shown in FIG. 6, the optical axes of the wavelength-multiplexed beams L1*a*, L1*b* intersect with each other, between the optical apertures 14*a*, 14*b* and the input ports 1*c*, 1*d* in the propagation directions of the wavelength-multiplexed beams L1*a*, L1*b*. In this case, the coupling of the wavelength-multiplexed beams L1*a*, L1*b* can be reduced, so as to effectively reduce crosstalk.

Third Modification Example

Figure 8:
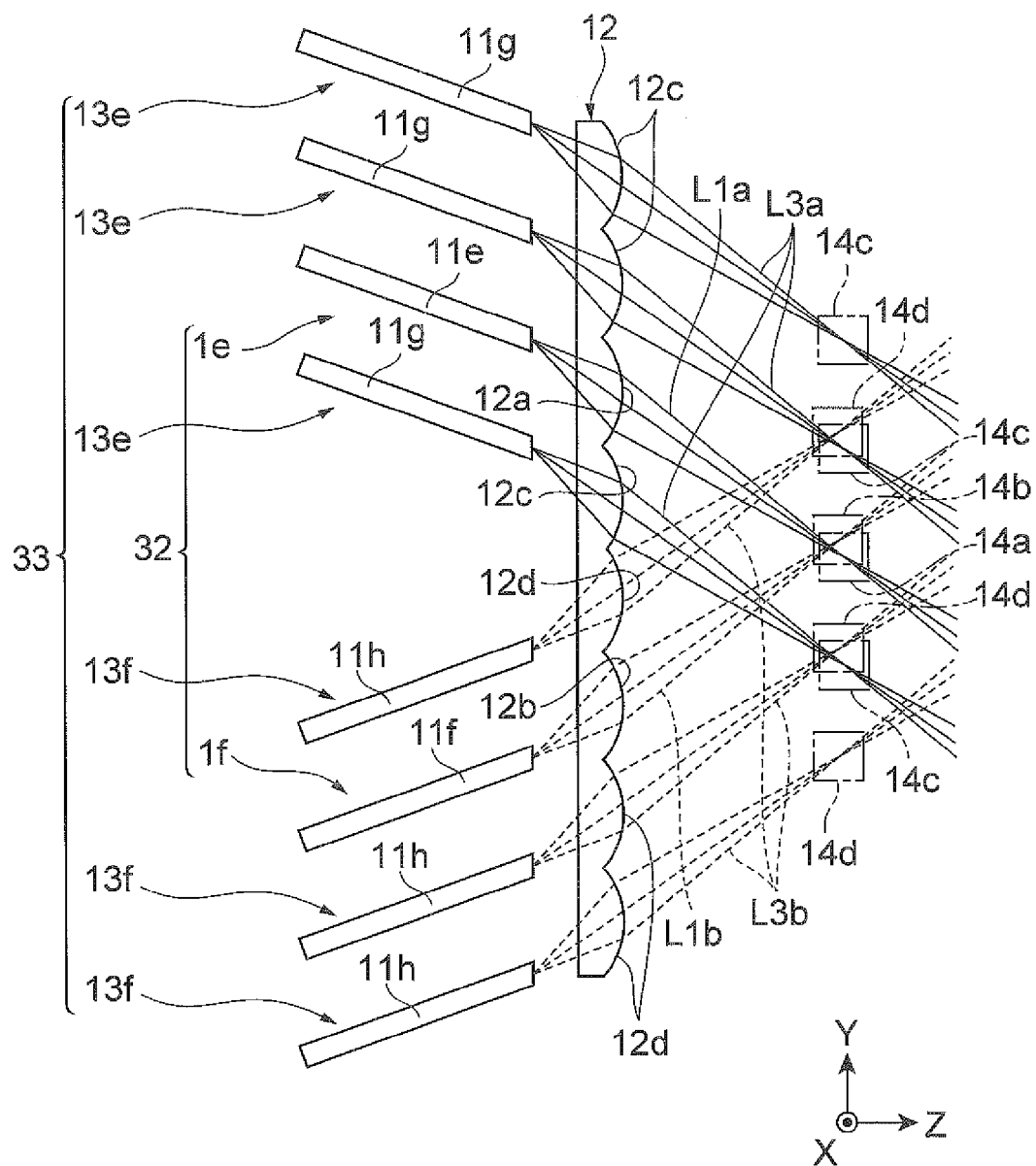
FIG. 8 is a view showing a modification example of the configurations of the light input section and the light output section.
Figure 9:
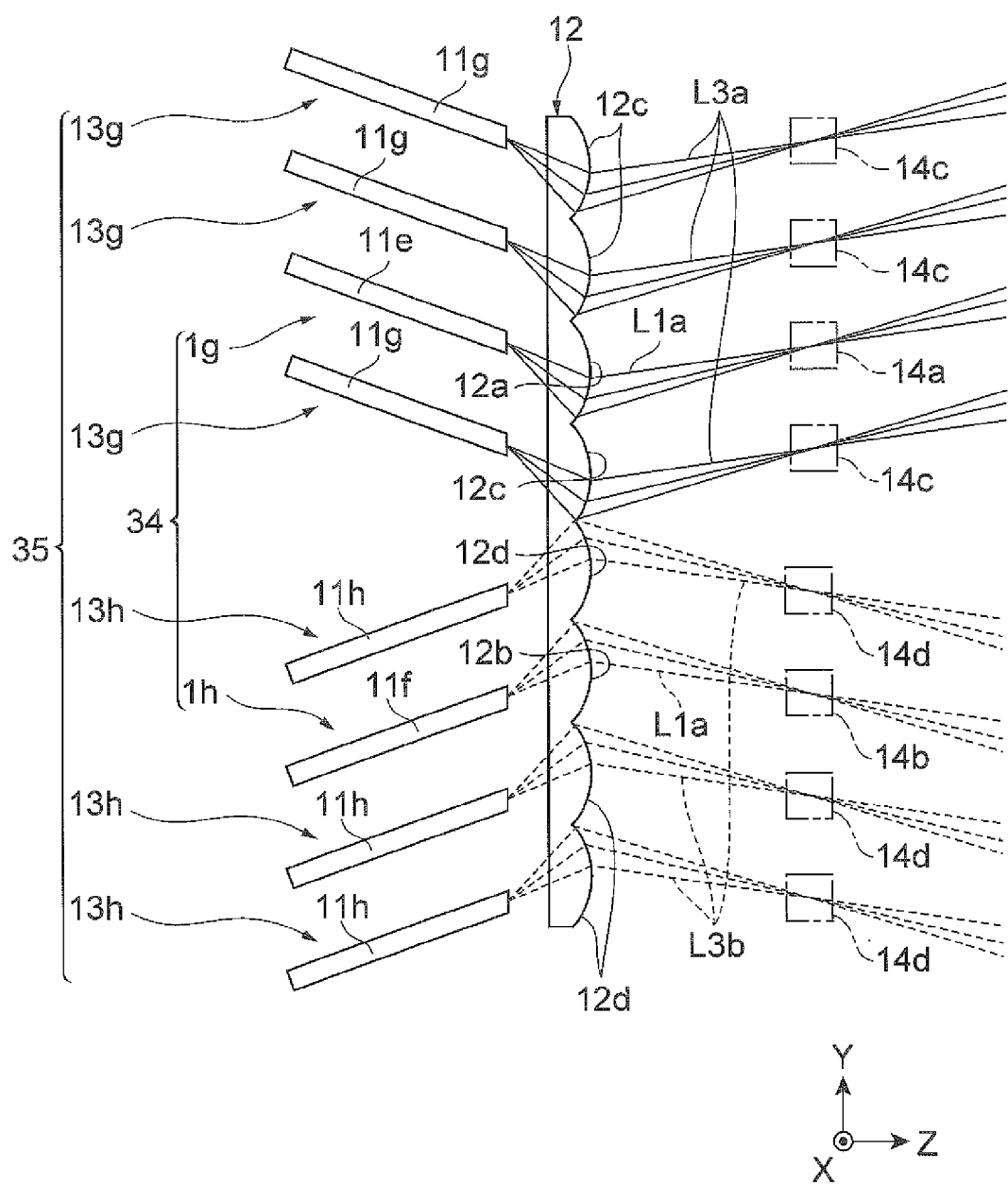
FIG. 9 is a view showing another modification example of the configurations of the light input section and the light output section.

FIG. 8 and FIG. 9 are drawings showing modifications of the configurations of the light input section and the light output section. The light input section 32 shown in FIG. 8 constitutes the first element of the optical path control device according to the one aspect of the present invention and has one or more first input ports 1*e* and one or more second input ports 1*f*. The input ports 1*e*, 1*f* are arranged in juxtaposition in the Y-axis direction (first direction). The first wavelength-multiplexed beam L1*a* is input to the input port 1*e*. The second wavelength-multiplexed beam L1*b* is input to the input port 1*f*.

The light output section 33 shown in FIG. 8 constitutes the thirteenth element of the optical path control device according to the one aspect of the present invention and has one or more first output ports 13*e* and one or more second output ports 13*f*. The output ports 13*e*, 13*f*, together with the input ports 1*e*, 1*f*, are arranged in juxtaposition in the Y-axis direction (first direction). The output port 13*e* outputs the first multiplexed beam L3*a*. The output port 13*f* outputs the second multiplexed beam L3*b*.

The input port 1*e* in the present modification example includes an optical fiber 11*e* and the optical power element 12*a*. However, the optical axis of the optical fiber 11*e* is inclined relative to the Z-axis, different from the first embodiment. Because of this, the wavelength-multiplexed beam L1*a* is output at the propagation angle θ° from the end face of the optical fiber 11*e*. The wavelength-multiplexed beam L1*a*, after output from the end face of the optical fiber 11*e*, is condensed by the optical power element 12*a*, while maintaining the propagation angle. The input port 1*f* includes an optical fiber 11*f* and the optical power element 12*b*. The optical axis of the optical fiber 11*f* is inclined relative to the Z-axis opposite to the optical fiber 11*e*. Because of this, the wavelength-multiplexed beam L1*b* is output at the propagation angle −θ° from the end face of the optical fiber 11*f*. The wavelength-multiplexed beam L1*b*, after output from the end face of the optical fiber 11*f*, is condensed by the optical power element 12*b*, while maintaining the propagation angle.

The output port 13*e* in the present modification example includes an optical fiber 11*g* and the optical power element 12*c*. The optical axis of the optical fiber 11*g* is inclined relative to the Z-axis as the optical fiber 11*e* of the input port 1*e* is. Because of this, the multiplexed beam L3*a* propagating at the propagation angle θ° can suitably enter the end face of the optical fiber 11*g*, after condensed by the optical power element 12*c*. The output port 13*f* includes an optical fiber 11*h* and the optical power element 12*d*. The optical axis of the optical fiber 11*h* is inclined relative to the Z-axis opposite to the optical fiber 11*g* as the optical fiber 11*f* of the input port 1*f* is. Because of this, the multiplexed beam L3*b* propagating at the propagation angle −θ° can suitably enter the end face of the optical fiber 11*h*, after condensed by the optical power element 12*d*.

The light input section 34 shown in FIG. 9 has one or more first input ports 1*g* and one or more second input ports 1*h*. As in the case of the configuration shown in FIG. 8, the first input port 1*g* includes the optical fiber 11*e* and the optical power element 12*a* and the second input port 1*h* includes the optical fiber 11*f* and the optical power element 12*b*. In the light input section 34, however, the optical axes of the respective optical fibers 11*e*, 11*f* deviate from the optical axes of the respective optical power elements 12*a*, 12*b*, and the directions of inclinations of the propagation directions of the wavelength-multiplexed beams L1*a*, L1*b* are inverted by the optical power elements 12*a*, 12*b*. Because of this, the wavelength-multiplexed beam L1*a* propagates at the propagation angle −θ° and the wavelength-multiplexed beam L1*b* does at the propagation angle θ°.

The light output section 35 shown in FIG. 9 has one or more first output ports 13*g* and one or more second output ports 13*h*. As in the case of the configuration shown in FIG. 8, the first output port 13*g* includes the optical fiber 11*g* and the optical power element 12*c* and the second output port 13*h* includes the optical fiber 11*h* and the optical power element 12*d*. In the light output section 35, however, the optical axes of the respective multiplexed beams L3*a*, L3*b* incident to the optical power elements 12*c*, 12*d* deviate from the optical axes of the respective optical power elements 12*c*, 12*d*, and the beams enter the optical fibers 11*g*, 11*h* after the directions of inclinations of the propagation directions of the multiplexed beams L3*a*, L3*b* are inverted.

In the present modification example, normals to the end faces of the optical fibers 11*e* to 11*h* are inclined in the Y-axis direction with respect to the optical axes of the optical fibers 11*e* to 11*h* (i.e., with respect to the central axes of cores of the optical fibers 11*e* to 11*h*). In other words, the end faces of the optical fibers 11*e* to 11*h* are inclined in the Y-axis direction with respect to planes normal to the optical axes of the optical fibers 11*e* to 11*h*. Therefore, the optical axes of the input/output beams L1a, L1b, L3a, and L3b to and from the optical fibers 11e to 11h have a certain angle of refraction in the YZ plane with respect to the optical axes of the optical fibers 11e to 11h.

The above embodiment described one embodiment of the optical path control device according to the one aspect of the present invention. Therefore, the optical path control device according to the one aspect of the present invention does not have to be limited to the foregoing optical path control device 100 and the optical path control device 100 can be optionally modified without departing from the spirit and scope of each of the claims.

Furthermore, the optical path control device 100 was described as the example wherein the same optical system was used for the elements on the optical path (forward path) from the light input section 1 to the optical deflectors 7a and 7b and for the elements on the optical path (backward path) from the optical deflectors 7a and 7b to the light output section 13, but the optical path control device according to the one aspect of the present invention does not have to be limited to this example.

What is claimed is:

1. An optical path control device comprising first to thirteenth elements,
    wherein the first element includes a first input port to which a first wavelength-multiplexed beam is input and a second input port to which a second wavelength-multiplexed beam is simultaneously input,
    wherein the second element is comprised of the third and fourth elements and is an anamorphic converter configured to convert an aspect ratio of beam spots of the first and second wavelength-multiplexed beams input from the first and second input ports,
    wherein the third element includes first and second optical power elements arranged in juxtaposition in propagation directions of the first and second wavelength-multiplexed beams and configured to converge the first and second wavelength-multiplexed beams in a plane spanned by the propagation directions of the first and second wavelength-multiplexed beams and a first direction,
    wherein the fourth element includes a third optical power element configured to collimate the first and second wavelength-multiplexed beams in a plane spanned by a second direction perpendicular to the first direction and the propagation directions of the wavelength-multiplexed beams,
    wherein the fifth element is a first dispersive element configured to rotate a propagation direction of light of each wavelength included in each of the first and second wavelength-multiplexed beams around an axis along the first direction depending upon the wavelength, in a plane spanned by the propagation directions of the first and second wavelength-multiplexed beams output from the second element and the second direction, thereby to generate each of a plurality of first dispersed beams and a plurality of second dispersed beams characterized by wavelengths,
    wherein the sixth element includes a fourth optical power element configured to converge each of the first and second dispersed beams and align propagation directions of the first and second dispersed beams with each other, in a plane spanned by the propagation directions of the first and second dispersed beams output from the fifth element and the second direction,
    wherein the seventh element is first and second optical deflectors configured to rotate each of the first and second dispersed beams around an axis along a third direction perpendicular to the first direction, in a plane spanned by the propagation directions of the first and second dispersed beams output from the sixth element and the first direction, the first and second optical deflectors being provided in juxtaposition in the first direction,
    wherein the eighth element includes a fifth optical power element configured to rotate each of the first and second dispersed beams output from the seventh element around an axis along a fourth direction perpendicular to the third direction depending upon the wavelength, in a plane spanned by the propagation directions of the first and second dispersed beams output from the seventh element and the third direction,
    wherein the ninth element is a second dispersive element configured to multiplex each of the first and second dispersed beams, in a plane spanned by the propagation directions of the first and second dispersed beams output from the eighth element and the third direction, to generate first and second multiplexed beams,
    wherein the tenth element is comprised of the eleventh and twelfth elements and is an anamorphic converter configured to convert an aspect ratio of beam spots of the first and second multiplexed beams,
    wherein the eleventh element includes sixth and seventh optical power elements configured to converge the first and second multiplexed beams in a plane spanned by propagation directions of the first and second multiplexed beams and the fourth direction,
    wherein the twelfth element includes an eighth optical power element configured to converge the first and second multiplexed beams in a plane spanned by the propagation directions of the first and second multiplexed beams and the third direction,
    wherein the thirteenth element includes first and second output ports configured to output the first and second multiplexed beams, respectively, output from the tenth element,
    wherein the first element forms first and second optical apertures to output the first and second dispersed beams, respectively, so that propagation angles of the first and second dispersed beams are different from each other in a second plane spanned by the propagation directions of the first and second dispersed beams and the first direction, at a focal position on the fifth element side of the sixth element, and
    wherein the first and second dispersed beams having propagated at the respective angles different from each other in the second plane are individually coupled to the first and second optical deflectors, respectively.

2. The optical path control device according to claim 1,
    wherein the first and second input ports are arranged in juxtaposition in the first direction, and
    wherein the first element forms third and fourth optical apertures to output the first and second wavelength-multiplexed beams, respectively, so that propagation angles of the first and second wavelength-multiplexed beams are different from each other in a second plane spanned by the propagation directions of the first and second wavelength-multiplexed beams and the first direction, at a focal position on the first element side of the third element.

3. The optical path control device according to claim 2,
    wherein optical axes of the first and second wavelength-multiplexed beams intersect with each other, between the third and fourth optical apertures and the first and second input ports in the propagation directions of the first and second wavelength-multiplexed beams.

4. The optical path control device according to claim 1, wherein a focal position of the first element in the propagation directions of the first and second wavelength-multiplexed beams is coincident with a focal position on the first element side of the first optical power element in the directions, and wherein the first element makes the first and second wavelength-multiplexed beams propagate at respective angles different from each other in the plane spanned by the propagation directions of the first and second wavelength-multiplexed beams and the first direction.

5. The optical path control device according to claim 1, wherein the first element further includes a tenth optical power element configured to adjust beam diameters of the first and second dispersed beams at the first and second optical apertures.

6. The optical path control device according to claim 1, wherein each of the first and second optical power elements includes a plurality of lenses arranged as divided along the first direction.

7. The optical path control device according to claim 1, wherein each of the sixth to eighth optical power elements includes a plurality of lenses arranged as divided along the fourth direction.

8. The optical path control device according to claim 1, wherein an optical power of the first optical power element and an optical power of the second optical power element are equal to each other.

9. The optical path control device according to claim 1, wherein an optical power of the sixth optical power element and an optical power of the seventh optical power element are equal to each other.

* * * * *